March 21, 1933.  T. I. DUFFY  1,901,869
RUNNING BOARD TRIM AND SECURING MEANS
Filed Oct. 13, 1930
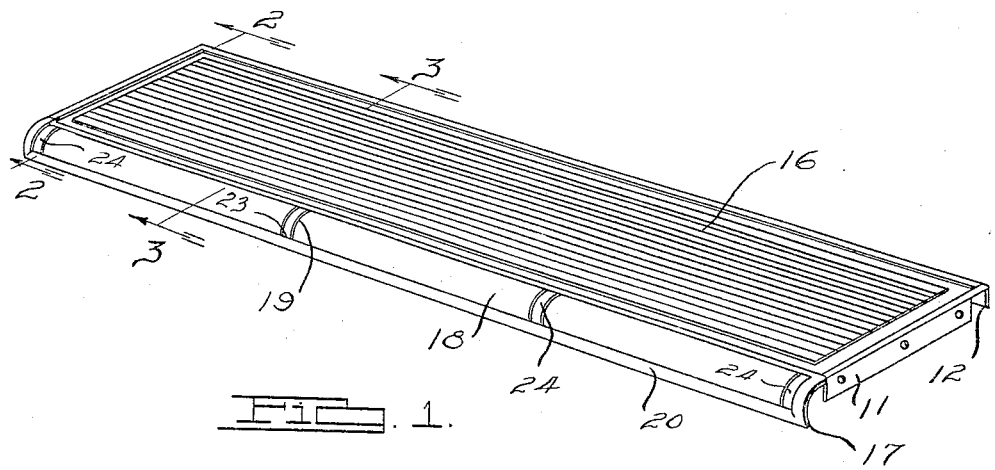
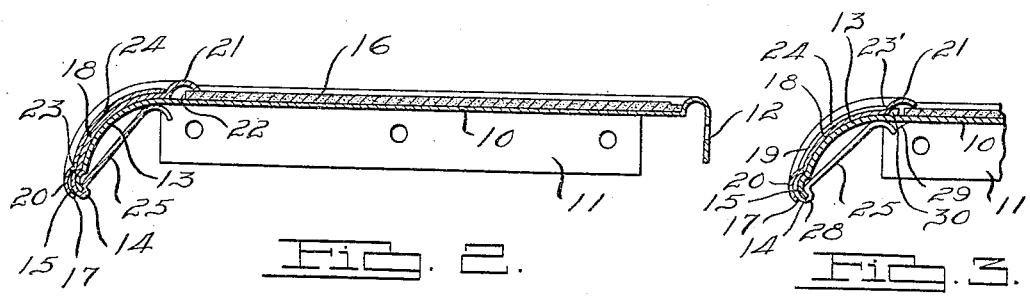
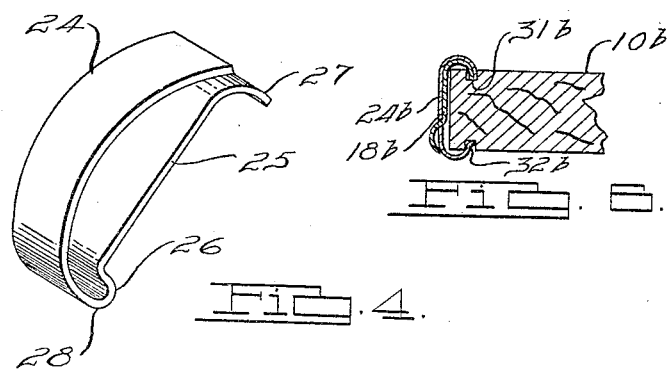
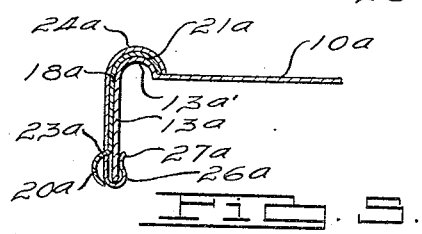
INVENTOR
Tom I. Duffy.
BY
Harness, Dickey, Pierce & Hann
ATTORNEYS.

Patented Mar. 21, 1933

1,901,869

UNITED STATES PATENT OFFICE

TOM I. DUFFY, OF FLINT, MICHIGAN, ASSIGNOR, BY MESNE ASSIGNMENTS, TO YOUNG MOTOR TRUNK COMPANY, OF FLINT, MICHIGAN, A CORPORATION OF MICHIGAN

RUNNING BOARD TRIM AND SECURING MEANS

Application filed October 13, 1930. Serial No. 488,240.

Although the principles relied on in the present invention are believed to be applicable to various structural assemblies, the invention has been devised, and is herein illustrated, with particular reference to running board decoration and reinforcement; and it is an especial merit of the novel "trim" herein described, and the novel retaining means therefor, that these permit of an inexpensive separate production of the element referred to and the attachment of the trim, as a final operation, after the complete assembly of a car.

It is an object of the invention to provide, adjacent the main or plate element of a running board which includes an integral or other rounded "nosing" at the outer edge thereof, a similarly rounded and longitudinally extending trim element,—said nosing and said trim element being preferably provided with similar beads at a lower or outer edge thereof and said trim element being preferably provided additionally with a longitudinally extending bead at its upper or inner edge. This latter bead, when provided, may serve not only as a reinforcement but as an aid in the retention and protection of any rubber mat, or the like, carried by the main or plate element of the running board.

For use in conjunction with the mentioned parts, it is an object of this invention to provide special resilient clips, these being substantially crescent shaped, as viewed in end or edge elevational outline; and each may comprise, in addition to an outer leg or element corresponding in curvature to the mentioned nosing, a normally concealed inner leg or element. The latter is preferably straight but is so bent, at the respective ends thereof, as to provide not only a curved lip which facilitates an initial movement in applying the clip but also a shoulder that is engageable within the longitudinal bead at the edge of the mentioned nosing,—an opening being so provided adjacent the corresponding bead upon the trim element that the mentioned rounded leg of said clip, advancing through said opening may be pressed or driven into a final position of interlocking engagement which retains said clip and trim upon said nosing. Although secure, this mode of connection permits of an inexpensive separate production of mentioned parts and also of an easy and economical replacement of said trim in case of damage thereto.

It will be understood that the mentioned trim may be modified as desired, to serve not merely for a reinforcing effect but for a decorative effect. For example, it may be completely surrounded by a bordering bead but nevertheless divided into a plurality of panels, three being shown, by lesser beads which serve also to provide guides for the mentioned strips; but these and additional special features of the invention may be best appreciated from the following description of an illustrative embodiment thereof, taken in connection with the appended claims and the accompanying drawing.

Fig. 1 is a perspective view showing a structural assembly in the form of a running board carrying a mat and bordered by a trim strip which is secured by special clips,—said trim strip and said clips being illustrative of the present invention.

Fig. 2 is a transverse section, taken substantially as indicated by the line 2—2 of Fig. 1.

Fig. 3 is a view taken similarly to Fig. 2, but on the line 3—3 of Fig. 1, parts being broken away and optional features of modification being shown.

Fig. 4 is a separate perspective view of a preferred type of clip, shown on a larger scale.

Fig. 5 is a view comparable with Fig. 3 but showing a form of the invention as applied to a so-called "square-edge" sheet metal running board.

Fig. 6 resembles Fig. 5, but suggests an application of the same idea to a suitably grooved running board formed of wood.

Referring first to the more general features of the illustrated embodiments of the invention, a running board comprising a plate element 10, apertured and flanges 11, and an inner or longitudinal attachment flange 12 is shown as including also a continuously rounded nosing 13, preferably integral therewith and downwardly terminating in an outer edge 14, bordered by a bead 15. A usual rubber or composition mat 16 being optionally disposed (and presumably cemented) upon the plate 10, a novel longitudinally extending trim strip 17 is shown as including not only a plurality of panels 18, bordered at the ends thereof by comparatively narrow guide beads 19, but a pair of longitudinally extending and parallel beads 20 and 21,—the former of these being curved similarly to and disposed opposite to the mentioned bead upon the nosing 13, and the bead 21 being so shaped and positioned as to overlie and safeguard the outer edge 22 of the mat 16.

Although alternative means might be employed to secure the strip 17, artistic and utilitarian considerations alike favor the removable attachment thereof by special crescent-type and comparatively stiff but resilient clips such as are separately shown in Fig. 4,—openings 23, corresponding to the cross sectional dimensions of the stock from which these strips are made, being provided between each pair of guide beads 19 and adjacent the upper edge of the longitudinally extending bead 20. Each of the mentioned clips may include not only an outer and rounded leg 24, adapted to be inserted through one of the openings 23, but an inner and preferably straight leg 25. The latter is shown as connected with leg 24 by a rebent curved portion 26, adapted to interlock with the mentioned bead 15 at the edge of the nosing 13; and the free edge of the leg 25 may advantageously be provided with a curved lip 27, so engageable beneath the plate 10 or the nosing 13 as to serve both for an anti-rattling and a strengthening effect,—either continuous pressure or a sharp blow upon a rounded head or end 28 of the clip being effective to seat the same in the interlocking relationship illustrated in Fig. 2.

In Fig. 5, a flat flange 13a being disposed substantially at right angles to plate 10a, a bead 13a' is shown as interfitting within a bead 21a,—provided upon a trim element which comprises also a flat portion 18a and a bead 20a, apertured at 23a; and a rebent portion 26a and a clip 27a may be provided on a clip such as that shown,—comprising a single leg 24a. This leg overlies the bead 21a; but this form suggests that the clip need include no inner leg; and Fig. 6 will be seen to suggest the retention of a trim strip comprising a flat portion 18b by means of a similar clip comprising an outer leg 24b, the respective ends of this clip being received within grooves 31b and 32b in a wooden running board 10b. It will be understood that, in any and all forms, the use of an edge of the trim strip to retain a mat is optional.

It will be seen that the provision of openings 23 serves not only to obviate exposure of the rounded ends 28 of the clips but to interlock said ends in bead 20; and it is suggested in Fig. 3 that an enhancement of the bracing effect of the leg 25 may be effected by locally providing, beneath the bead 21, bosses 29 disposed suitably for a compressive engagement with the rounded lips 27 of legs 25; and also that, if desired, the bead 21 may be provided with openings, as at 23', to receive slightly elongated tips 30, upon the ends of the rounded legs 24 of said clips; and it may be further suggested that an enhancement of decorative effects may be secured by enameling the strips, or at least the outer legs 24 thereof, with either the "body" color of the car or with a color used in the striping of the car; but it will be understood not only that various features of the present invention might be independently employed, but also that numerous modifications, additional to any suggested herein, might easily be devised by skilled workers, if informed of the foregoing,—all without departure from the scope of the present invention, as the latter is indicated above and in the following claims.

I claim:

1. In a running board assembly: a plate having a rounded nosing element at an edge thereof; and a longitudinally extending trim element rounded similarly to, and provided with means for its retention in engagement with said nosing element,—said last-mentioned means comprising clips and one of said elements being provided with openings for the reception of said clips.

2. In a running board assembly: a plate having a rounded nosing element at an edge thereof; and a longitudinally extending trim element rounded similarly to, and provided with means for its retention in engagement with said nosing element,—said means comprising retaining clips engaging both an outer face of said trim element and an inner face of said nosing.

3. In a structural assembly comprising a plate element having a rounded nosing element at an edge thereof: a longitudinally extending trim element rounded similarly to said nosing element and provided with openings for the reception of retaining clips which are engageable with both said nosing and said trim element.

4. For use on a running board provided with a mat and with a rounded nosing element: a trim element rounded similarly to said nosing and provided, at its inner edge, with a longitudinally extending bead which is adapted to overlie an edge of a mat; and clip means for engaging said trim element and said nosing for retaining them in assembled relation.

5. In a structural assembly comprising a rounded nosing: a trim element extending longitudinally of said nosing and rounded similarly thereto,—said trim element being provided, at its respective edges with longitudinally extending beads; and clip means, including a portion extending beneath one of said beads, for securing said trim element to said nosing.

6. In a structural assembly comprising a rounded nosing element: a trim element extending longitudinally of said nosing and rounded similarly thereto and clip means for retaining said trim element and said nosing element in assembled relation,—the nosing element and said trim element being provided with mutually engageable longitudinal beads and one of said elements being apertured adjacent the bead thereof suitably for the reception of said clip means.

7. In a structural assembly comprising a rounded nosing: a trim element extending longitudinally of said nosing and rounded similarly thereto,—the nosing element and said trim element being provided with mutually engageable longitudinal beads and one of said elements being apertured adjacent the bead thereof suitably for the reception of retaining means for said trim element; and crescent-type retaining clips each comprising a rounded leg and a substantially straight leg, said rounded leg being projected through one of the apertures in said trim element and said legs being respectively disposed in external engagement with said trim element and in internal engagement with said nosing.

8. A trim for the running board of an automobile comprising a concave trim element adapted to fit over the edge of the running board, said element being slotted adjacent to its lower edge and a clip for securing the trim element in position having an upper portion embracing the upper portion of the trim element and a lower portion adapted to extend through the opening in the trim element and to hook under the edge of the running board to resiliently clamp the trim element to the board.

9. A trim structure for the running board of automobiles comprising a concave trim element adapted to embrace the edge of the running board, the element having an opening formed adjacent the lower edge thereof, a clip embracing the upper portion of the trim element, the lower portion thereof extending through said opening and hooking under the edge of the running board.

10. A trim element for the running board of an automobile comprising a concave channel-like structure adapted to embrace the outer edge of the running board and having an outwardly flared bead along the lower edge thereof, an opening formed through the trim element at the juncture of the bead and the main body of the element and adapted to receive a spring clip projecting therethrough and hooking under the lower edge of the running board.

TOM I. DUFFY.